United States Patent
Iermolenko et al.

(10) Patent No.: US 12,407,912 B2
(45) Date of Patent: Sep. 2, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Ruslan Iermolenko, Kyiv (UA); Andrii Sukhariev, Kyiv (UA); Kostiantyn Morozov, Kyiv (UA); Iegor Vdovychenko, Kyiv (UA); Volodymyr Savin, Kyiv (UA); Dmytro Vavdiiuk, Kyiv (UA); Oleksandr Klimenkov, Kyiv (UA); Oleksandr Sapozhnik, Kyiv (UA)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 124 days.

(21) Appl. No.: 18/134,882

(22) Filed: Apr. 14, 2023

(65) Prior Publication Data

US 2023/0254568 A1    Aug. 10, 2023

Related U.S. Application Data

(63) Continuation of application No. PCT/KR2022/019613, filed on Dec. 5, 2022.

(30) Foreign Application Priority Data

Dec. 20, 2021    (KR) .................. 10-2021-0182842

(51) Int. Cl.
*H04N 23/61* (2023.01)
*G06V 10/46* (2022.01)

(52) U.S. Cl.
CPC ............. *H04N 23/61* (2023.01); *G06V 10/46* (2022.01)

(58) Field of Classification Search
CPC ........ H04N 23/61; H04N 17/002; H04N 5/77; H04N 23/80; G06V 10/46; G06V 20/35; G06T 7/00; G06T 7/80; G06T 7/97
(Continued)

(56) References Cited

U.S. PATENT DOCUMENTS 7,158,174 B2    1/2007    Gindele et al.
8,405,717 B2    3/2013    Kim et al.
(Continued)

FOREIGN PATENT DOCUMENTS

EP    3 086 284 A1    10/2016
JP    2010-181209 A    8/2010
(Continued)

OTHER PUBLICATIONS

"[Into the Future With Samsung Research (1)] Samsung R&D Institute Ukraine: Innovating Within the Visual Intelligence Field for New User Experiences", Samsung Newsroom, Sep. 23, 2021, 8 Pages, URL: https://bit.ly/3hBduRx.
(Continued)

*Primary Examiner* — Lin Ye
*Assistant Examiner* — Chan T Nguyen
(74) *Attorney, Agent, or Firm* — Sughrue Mion, PLLC

(57) ABSTRACT

An electronic apparatus is provided. The electronic apparatus includes a camera, a memory in which a plurality of captured images obtained through the camera and a parameter value of the camera are stored, and a processor electrically connected to the camera and the memory. The processor is configured to identify a scene type corresponding to each captured image of the plurality of captured images; extract a feature point of each captured image of the plurality of captured images based on a feature point extraction method corresponding to the identified scene type of each captured image; obtain a calibration parameter value corre-
(Continued)

sponding to a feature type of each extracted feature point; obtain an integrated calibration parameter value based on one or more obtained calibration parameter values; and update the parameter value stored in the memory based on the integrated calibration parameter value.

15 Claims, 17 Drawing Sheets

(58) Field of Classification Search
USPC .................................................. 348/207.99
See application file for complete search history.

(56) References Cited

U.S. PATENT DOCUMENTS

| | | | |
|---|---|---|---|
| 8,619,144 | B1 | 12/2013 | Chang et al. |
| 9,185,402 | B2 | 11/2015 | Wu et al. |
| 9,563,951 | B2 | 2/2017 | Okouneva |
| 10,070,052 | B2 | 9/2018 | Fukui |
| 10,347,009 | B1 | 7/2019 | Terven et al. |
| 10,841,570 | B2 | 11/2020 | Kytsun et al. |
| 11,030,452 | B2 | 6/2021 | Ernst et al. |
| 11,475,595 | B2 | 10/2022 | Huang et al. |
| 2013/0135474 | A1* | 5/2013 | Sakano ............... G06V 20/56 348/148 |
| 2013/0259375 | A1* | 10/2013 | Dunlop ............... G06V 20/38 382/173 |
| 2014/0313347 | A1* | 10/2014 | Wu ........................ G06T 7/80 348/187 |
| 2016/0073102 | A1 | 3/2016 | Meloun et al. |
| 2017/0019656 | A1 | 1/2017 | Liu et al. |
| 2018/0286079 | A1 | 10/2018 | Ben Moshe et al. |
| 2019/0095713 | A1* | 3/2019 | Leroy ................... G06V 10/56 |
| 2020/0014912 | A1 | 1/2020 | Kytsun et al. |
| 2020/0193643 | A1* | 6/2020 | Hess ....................... G06V 10/44 |
| 2020/0204727 | A1* | 6/2020 | Wang ..................... G06V 10/82 |
| 2020/0234467 | A1 | 7/2020 | Tran et al. |

FOREIGN PATENT DOCUMENTS

| | | |
|---|---|---|
| JP | 2014-217052 A | 11/2014 |
| JP | 6656132 B2 | 3/2020 |
| JP | 2020-193950 A | 12/2020 |
| JP | 2021-140262 A | 9/2021 |
| KR | 10-2020-0005332 A | 1/2020 |
| KR | 10-2020-0084552 A | 7/2020 |
| WO | 2012/139636 A1 | 10/2012 |
| WO | 2012/145822 A1 | 11/2012 |
| WO | 2016/195123 A1 | 12/2016 |
| WO | 2017/208314 A1 | 12/2017 |

OTHER PUBLICATIONS

Ricard Boada Farràs, "Active Camera Calibration for Robotic Systems, Swiss Federal Institute of Technology's solution", 2016, 49 Pages.
Written Opinion (PCT/ISA/237) issued by the International Searching Authority on Mar. 14, 2023 in International Application No. PCT/KR2022/019613.
International Search Report (PCT/ISA/210) issued by the International Searching Authority on Mar. 14, 2023 in International Application No. PCT/KR2022/019613.
Communication dated Jan. 21, 2025, issued by the European Patent Office in European Patent Application No. 22911686.8.

* cited by examiner

C-calibration
E-evaluation

ELECTRONIC APPARATUS AND CONTROLLING METHOD THEREOF

CROSS-REFERENCE TO RELATED APPLICATION(S)

This application is a continuation application, claiming priority under § 365(c), of an International application No. PCT/KR2022/019613, filed on Dec. 5, 2022, which is based on and claims the benefit of a Korean patent application number 10-2021-0182842, filed on Dec. 20, 2021, in the Korean Intellectual Property Office, the disclosure of which is incorporated by reference herein in its entirety.

TECHNICAL FIELD

The disclosure relates to an electronic apparatus and a controlling method thereof, and more particularly, to an electronic apparatus that corrects a captured image and a controlling method thereof.

Background Art

A user may capture or photograph an image through a camera provided in an electronic apparatus such as a smartphone and store the image. When there is an impact applied to the electronic apparatus or deterioration of camera performance over time, distortion may occur in the captured image and thus, a subject in the captured image may be stored in a shape different from its actual appearance.

SUMMARY

The disclosure is to provide an electronic apparatus, which extracts a feature point according to a type of a captured image and corrects a parameter value of a camera based on the extracted feature point, and a controlling method thereof.

According to an aspect of an example embodiment of the disclosure, provided is an electronic apparatus including: a camera; a memory in which a plurality of captured images obtained through the camera and a parameter value of the camera are stored; and a processor electrically connected to the camera and the memory and configured to: identify a scene type corresponding to each captured image of the plurality of captured images; extract a feature point of each captured image of the plurality of captured images based on a feature point extraction method corresponding to the identified scene type of each captured image; obtain a calibration parameter value corresponding to a feature type of each extracted feature point; obtain an integrated calibration parameter value based on one or more obtained calibration parameter values; and update the parameter value stored in the memory based on the integrated calibration parameter value.

The processor may be further configured to obtain a calibration parameter value corresponding to a captured image by correcting the parameter value stored in the memory corresponding to a feature type of an extracted feature point of the captured image.

The processor may be further configured to: identify a scene type corresponding to the captured image by assigning a reliability score for the scene type corresponding to the captured image; identify a weight for a parameter value corresponding to the captured image based on the reliability score for the scene type corresponding to the captured image; and obtain the integrated calibration parameter value further based on the identified weight.

The processor may be further configured to: correct a captured image based on a first calibration parameter value corresponding to a feature type of the captured image; obtain an error value of the corrected captured image based on a predetermined correction algorithm; and based on the obtained error value being less than a threshold value, obtain the integrated calibration parameter value based on the first calibration parameter value.

The processor may be further configured to: based on a scene type of a captured image being a first scene type or a second scene type, extract a feature point based on an object identified in the captured image; and based on a scene type of the captured image being a third scene type, randomly extract a feature point in the captured image.

The first scene type may be an outdoor scene type, the second scene type may be an indoor scene type, and the third scene type may be a regular pattern scene type.

The parameter value of the camera may be a value corresponding to at least one parameter among a focal length, a principal point, a skew coefficient, a distortion coefficient, a rotation information, or a translation information.

The electronic apparatus may further include: a sensor, and the processor may be further configured to: based on an external impact equal to or greater than a threshold value being sensed through the sensor, obtain the integrated calibration parameter value by driving a predetermined application and update the parameter value stored in the memory based on the integrated calibration parameter value.

The processor may be further configured to: based on a user command for correcting the parameter value of the camera being input, obtain the integrated calibration parameter value and update the parameter value stored in the memory based on the integrated calibration parameter value.

The scene type may include at least one of an outdoor scene type, an indoor scene type or a regular pattern scene type, and the feature type may correspond to the scene type.

According to an aspect of an example embodiment of the disclosure, provided is a controlling method of an electronic apparatus, including: identifying a scene type corresponding to each captured image of a plurality of captured images; extracting a feature point of each captured image of the plurality of captured images based on a feature point extraction method corresponding to the identified scene type of each captured image; obtaining a calibration parameter value corresponding to a feature type of each extracted feature point; obtaining an integrated calibration parameter value based on one or more obtained calibration parameter values; and updating a parameter value stored in a memory included in the electronic apparatus based on the integrated calibration parameter value.

The method may further include: obtaining a calibration parameter value corresponding to a captured image by correcting the parameter value stored in the memory corresponding to a feature type of an extracted feature point of the captured image.

The identifying the scene type may include: identifying a scene type corresponding to the captured image by assigning a reliability score for the scene type corresponding to the captured image; and identify a weight for a parameter value corresponding to the captured image based on the reliability score for the scene type corresponding to the captured image, and the obtaining the integrated calibration parameter value may include obtaining the integrated calibration parameter value further based on the identified weight.

The method may further include: correcting a captured image based on a first calibration parameter value corresponding to a feature type of the captured image; and obtaining an error value of the corrected captured image based on a predetermined correction algorithm, and the obtaining the integrated calibration parameter value may include obtaining the integrated calibration parameter value based on the first calibration parameter value.

The extracting a feature point may include: based on a scene type of the captured image being a first scene type or a second scene type, extracting a feature point based on an object identified in the captured image; and based on a scene type of the captured image being a third scene type, randomly extracting a feature point in the captured image.

The first scene type may be an outdoor scene type, the second scene type may be an indoor scene type, and the third scene type may be a regular pattern scene type.

The parameter value of the camera may be a value corresponding to at least one parameter among a focal length, a principal point, a skew coefficient, a distortion coefficient, a rotation information, or a translation information.

The obtaining the integrated calibration parameter value may include, based on an external impact equal to or greater than a threshold value being sensed through the sensor, obtaining the integrated calibration parameter value by driving a predetermined application.

The obtaining the integrated calibration parameter value may include, based on a user command for correcting the parameter value of the camera being input, obtaining the integrated calibration parameter value.

The scene type may include at least one of an outdoor scene type, an indoor scene type or a regular pattern scene type, and the feature type may correspond to the scene type.

BRIEF DESCRIPTION OF DRAWINGS

The above and/or other aspects will become more apparent by describing certain example embodiments with reference to the accompanying drawings, in which.

DETAILED DESCRIPTION

Figure 1A:
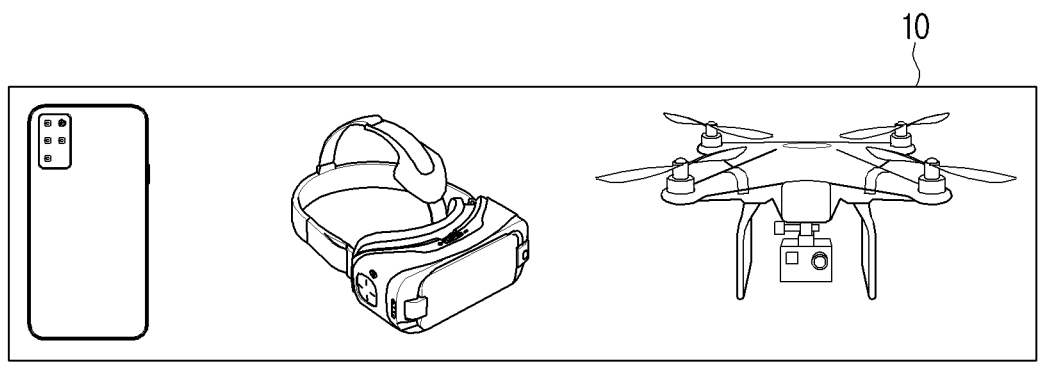
FIG. 1A is a view provided to explain a method of obtaining a captured image according to an embodiment.

Hereinafter, certain example embodiments of the disclosure will be described in detail with reference to accompanying drawings below.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expressions such as "at least one of A and B," "at least one of A or B," and "at least one of A and/or B" should be understood to represent either "A" or "B" or any one of "A and B."

Expressions such as "first," or "second," used in the disclosure may modify various components regardless of order and/or importance, and are used to distinguish one component from another component, and do not limit the corresponding components.

When it is mentioned that any component (e.g., a first component) is (operatively or communicatively) coupled with/to or is connected to another component (e.g., a second component), it is to be understood that any component is directly coupled to another component or may be coupled to another component through another component (e.g., a third component).

Singular expressions include plural expressions unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not illustrated) except for a 'module' or an 'unit' that needs to be implemented by specific hardware.

In the disclosure, a term "user" may be a person that uses an electronic apparatus or a device that uses an electronic apparatus (e.g., an artificial intelligence electronic apparatus).

Hereinafter, example embodiments of the disclosure will be described in detail with reference to accompanying drawings.

Figure 1B:
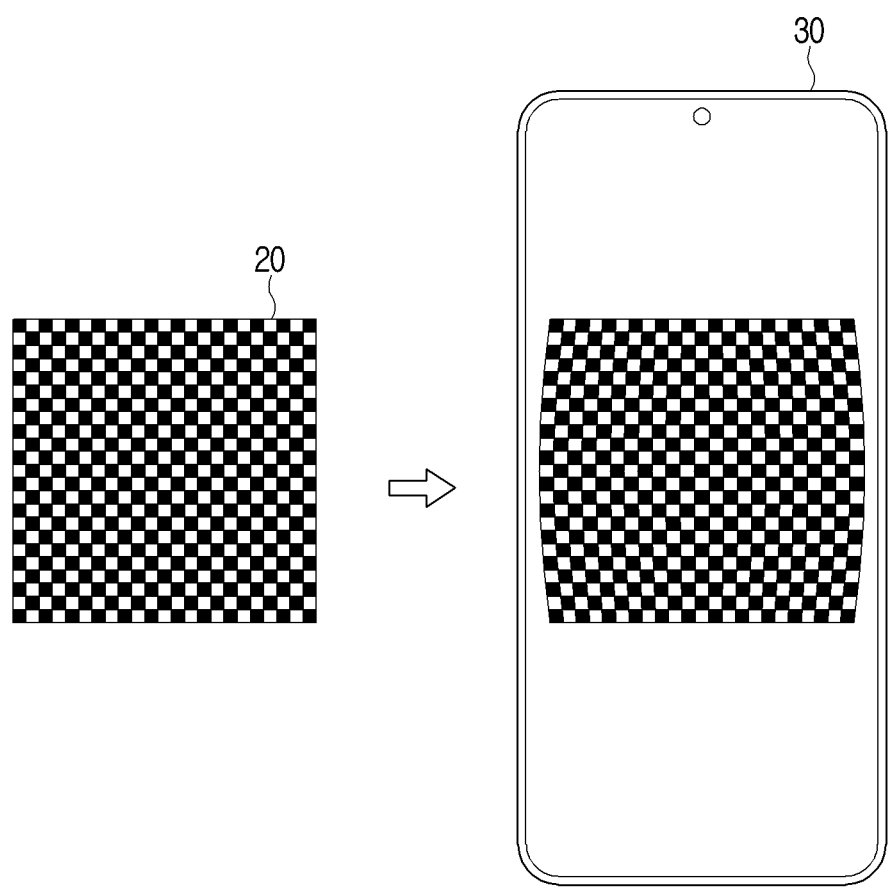
FIG. 1B is a view provided to explain a method of obtaining a captured image according to an embodiment.

FIGS. 1A and 1B are views provided to explain a method of obtaining a captured image according to an embodiment.

According to FIGS. 1A and 1B, a camera may be installed in an electronic apparatus 10 such as a smartphone 30, a Virtual Reality (VR) device, a drone, and the like. A processor of the electronic apparatus 10 may obtain an image through the camera in the electronic apparatus 10 and store the image in a memory (not illustrated).

However, under a certain situation such as, for example, when an impact is applied to the electronic apparatus 10 (e.g., the smartphone 30) or a camera parameter value changes over time, an image 20 captured by the camera may include a shape different from the actual shape of a subject, as shown in FIG. 1B. In order to prevent such distortion of the captured image, it may be necessary to correct the camera parameter value.

Hereinafter, various embodiments of extracting a feature point based on a type of the obtained captured image and correcting the camera parameter value based on the extracted feature point will be described.

Figure 2:
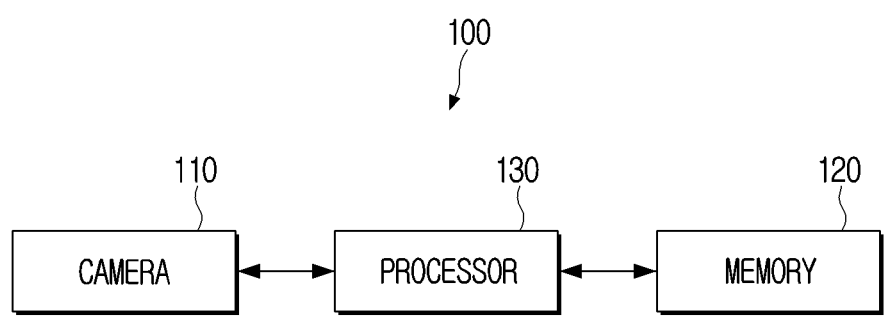
FIG. 2 is a block diagram provided to explain a configuration of an electronic apparatus according to an embodiment.

FIG. 2 is a block diagram provided to explain a configuration of an electronic apparatus according to an embodiment.

According to FIG. 2, an electronic apparatus 100 may include a camera 110, a memory 120 and a processor 130.

Here, the electronic apparatus 100 may include a display panel (not illustrated), which may be implemented as a touch screen together with a touch panel, and may include at least one of a smartphone, a tablet Personal PC (PC), a mobile medical device, a wearable device, an interactive whiteboard, or a kiosk, but is not limited thereto. The electronic apparatus 100 may include a camera that is installed inside, such as in a VR device and a drone, or include a camera that is installed outside.

The camera 110 may obtain an image by capturing (e.g., photographing) an area within a certain field of view (FoV). The camera 110 may include a lens for focusing visible light and other optical signals received after being reflected by an object to an image sensor and an image sensor capable of detecting visible light and other optical signals. Here, the image sensor may include a 2D pixel array divided into a plurality of pixels.

The processor (not illustrated) may obtain at least obtain at least one captured image through the camera 110.

The memory 120 may store data to be used in various embodiments of the disclosure. The memory 120 may be implemented in the form of a memory embedded in the electronic apparatus 100 or in the form of a memory attachable to and detachable from the electronic apparatus 100, depending on the purpose of data storage. For example, data for driving the electronic apparatus 100 may be stored in the memory embedded in the electronic apparatus 100, and data for an extended function of the electronic apparatus 100 may be stored in the memory attachable to and detachable from the electronic apparatus 100.

Meanwhile, the memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)). The memory attachable to and detachable from the electronic apparatus 100 may be implemented in the form such as a memory card (e.g., a compact flash (CF), a secure digital (SD), a micro secure digital (Micro-SD), a mini secure digital (Mini-SD), an extreme digital (xD), a multimedia card (MMC), or the like), an external memory (e.g., a USB memory) connectable to a USB port, or the like.

According to an embodiment, the memory 120 may store a plurality of captured images obtained through the camera 110 and a parameter value of the camera 110. According to an embodiment, the plurality of captured images and the parameter value of the camera 110 may be stored in separate memories. However, it is also possible to store the plurality of images and the parameter value in different address areas of the same memory.

According to another embodiment, the memory 120 may store information regarding an artificial intelligence model including a plurality of layers. Here, storing information regarding an artificial intelligence model means storing information related to an operation of the artificial intelligence model, for example, information regarding the plurality of layers included in the artificial intelligence model, information regarding parameters used in each of the plurality of layers (e.g., filter coefficients, bias, etc.), and the like. For example, the memory 120 may store information regarding an artificial intelligence model trained to classify an image type according to an embodiment.

The processor 130 controls the overall operations of the electronic apparatus 100. Specifically, the processor 130 may be connected to each component of the electronic apparatus 100 to control the overall operations of the electronic apparatus 100. The processor 130 may perform the operations of the electronic apparatus 100 according to various embodiments by executing at least one instruction stored in the memory 120.

According to an embodiment, the processor 130 may be controlled to the camera 110 and the memory 120 and control the electronic apparatus 100.

According to an embodiment, the processor 130 may be referred to as various names such as a digital signal processor (DSP), a microprocessor, a central processing unit (CPU), a micro controller unit (MCU), a micro processing unit (MPU), a neural processing unit (NPU), a controller, an application processor (AP), and the like, and in the specification of the disclosure, one or more of the above elements may be collectively referred to as the processor 130.

The processor 130 may be implemented as a system on chip (SoC) or a large scale integration (LSI), or in the form of a field programmable gate array (FPGA). In addition, the processor 130 may include a volatile memory such as an SRAM.

In addition, the processor 130 for executing an artificial intelligence model according to an embodiment may be a general-purpose processor such as a CPU, an AP, a digital signal processor (DSP), etc., a graphics-only processor such as a GPU and a vision processing unit (VPU), or may be implemented through combination of an AI-only processor such as an NPU with software. The processor 130 may control to process input data according to pre-defined operation rules stored in the memory 110 and/or the artificial intelligence model. Alternatively, when the processor 130 is a dedicated processor (or an AI-only processor), the processor 130 may be designed in a hardware structure specialized for processing a specific artificial intelligence model. For example, hardware specialized for processing a specific artificial intelligence model may be designed in a hardware chip such as an application specific integrated circuit (ASIC) or an FPGA. When the processor 130 is implemented as a dedicated processor, the processor 130 may be implemented to include a memory for implementing an embodiment of the disclosure or may be implemented to include a memory processing function for using an external memory.

According to an embodiment, the processor 130 may obtain a plurality of captured images through the camera 110, and identify a scene type corresponding to each of the plurality of obtained captured images. Here, the scene type is classified based on the characteristics of the captured images, and for example, the scene type may include at least one of an outdoor scene type, an indoor scene type, or a regular pattern scene type, but is not limited thereto.

According to an embodiment, when a captured image is an image corresponding to an external space (e.g., based on detection of outdoor brightness level or an outdoor object such as a building or a tree), the processor 130 may identify the image as an outdoor scene type, when a captured image is an image corresponding to an interior space (e.g., based on detection of indoor brightness level or an indoor object such as a laptop or a desktop PC), the processor 130 may identify the image as an indoor scene type, and when a captured image is an image where a certain pattern is formed (e.g., a wallpaper), the processor 130 may identify the image as a regular pattern scene type. The scene type will be described in detail with reference to FIG. 5A-5C.

According to another embodiment, the processor 130 may identify the scene type of a captured image using an artificial intelligence model trained to identify the scene type. According to an embodiment, an artificial intelligence model may be trained to identify at least one of an outdoor scene type, an indoor scene type or a regular pattern scene type. For example, when a captured image is input, the artificial intelligence model may be trained to output probability information for each scene type.

According to an embodiment, when the scene type of a captured image is identified, the processor 130 may extract a feature point of each of a plurality of captured images based on a feature point extraction method corresponding to the identified scene type. In other words, the processor 130 may extract the feature point of the captured image by applying a different feature point extraction method for each scene type.

Here, the feature point may include at least one of a unique feature of an object in the captured image, an arbitrary point in the captured image or a point corresponding to an arbitrary object, but is not limited thereto.

According to an embodiment, the processor 130 may extract a feature point of a captured image based on an object in the captured image. For example, when the captured image is identified as an outdoor scene type, the processor 130 may identify an outdoor object (e.g., a grass, a star, a tree, etc. but not limited thereto) in the captured image, identify a morphological feature of the identified outdoor object as a unique feature and extract the same as a feature point of the outdoor captured image.

According to another embodiment, when the captured image is identified as an indoor scene type, the processor 130 may identify an indoor object (e.g., a cup, a boot, etc. but not limited thereto) in the captured image, and extract a line or a circle of the identified indoor object (e.g., a line or a circle that defines a boundary of the object or a line or a circle recognized from an image of the object) as a unique feature of the object.

Meanwhile, when the captured image is identified as a regular pattern scene type, the processor 130 may extract an arbitrary point corresponding to an arbitrary object identified in the captured image as a feature point of the captured image, which will be described in detail with reference to FIGS. 7A to 7B.

Subsequently, according to an embodiment, the processor 130 may obtain a calibration parameter value corresponding to a feature type of the extracted feature point. In this case, the feature type may correspond to the scene type of the identified captured image. For example, the feature type may be divided into an outdoor type, an indoor type, or a regular pattern type. However, it is also possible to arbitrarily set a feature type corresponding to an outdoor scene as a first feature type, a feature type corresponding to an indoor scene as a second feature type, and a feature type corresponding to a regular pattern scene as a third feature type.

The calibration parameter value may be a value corresponding to at least one parameter from among a focal length, a principal point, a skew coefficient, a distortion coefficient, and an external parameter. The focal length is a distance from the center of a lens or spherical mirror to the focal point. The principal point is image coordinates of the foot of perpendicular from the center of the lens of the camera 110 to an image sensor (not illustrated) in the camera. The skew coefficient indicates a degree of inclination of a y-axis of a pixel array of the image sensor 110. The distortion coefficient indicates a degree of distortion that occurs due to radial distortion or tangential distortion. The external parameter is a parameter related to a transformation relationship between a camera coordinate system and an actual coordinate system, which can be expressed as a rotation and translation transformation between the two coordinate systems.

According to an embodiment, when a scene type corresponding to each captured image is identified, the processor 130 may extract a feature point of the captured image based on the scene type and obtain a calibration parameter value based on the extracted feature point. In this case, the processor 130 may obtain a calibration parameter value based on distortion information of the feature point.

For example, it is assumed that the processor 130 obtains a first captured image corresponding to an indoor space where a notebook PC and a monitor are included. In this case, the processor 130 may identify the notebook PC and the monitor which are objects in the captured image and accordingly, may identify the first captured image as an indoor scene type. When the scene type corresponding to the first captured image is identified as an indoor scene type, the processor 130 may extract the external features (which may include lines, circles or rectangles) of the identified notebook PC and monitor as feature points. Subsequently, the processor 130 may obtain a calibration parameter value of the captured image based on distortion information regarding the external features of the indoor objects such as curvature of lines or the shape of rectangles.

According to an embodiment, the processor 130 may assign a reliability score for a scene type corresponding to a captured image, and identify a weight for a parameter value corresponding to each captured image. In this case, the processor 130 may obtain a calibration parameter value based on the identified weight. Here, the reliability score is a value obtained by quantifying the degree of matching between the captured image and the corresponding scene type, and the higher the reliability score, the larger the size of the corresponding weight.

For example, when an image captures an indoor space, the processor 130 may identify a weight of 10 in the case of identifying the image as an indoor scene type, a weight of 6 in the case of an outdoor type, and a weight of 3 in the case of a regular pattern scene type, and may obtain a value generated by multiplying the weight by the obtained parameter value as a calibration parameter value of the captured image.

Subsequently, according to an embodiment, when a calibration parameter value corresponding to a feature type of a feature point is obtained, the processor 130 may obtain an integrated calibration parameter value based on the obtained calibration parameter value. The integrated calibration parameter may be obtained through at least one of the following mathematical equations. Here, C is the integrated calibration parameter value, Ci is an i-th calibration parameter value, and Si is an i-th reliability score value.

$$C = C_b, b = \arg_i \max S_i \qquad (1)$$

According to Mathematical Equation 1, the integrated calibration parameter may be a parameter having a relatively largest reliability score among a plurality of calibration parameters corresponding to a plurality of captured images.

$$C = \frac{\sum_i S_i \times Ci}{\sum_i S_i} \qquad \text{(Mathematical Equation 2)}$$

According to Mathematical Equation 2, the integrated calibration parameter may be a value obtained by multiplying a plurality of calibration parameters corresponding to a plurality of captured images and respective reliability scores corresponding thereto and dividing the sum by the total of the reliability scores. In this case, it is possible to obtain the integrated calibration parameter by obtaining a weight of a parameter value corresponding to each of the plurality of captured images based on the reliability scores and multiplying the same by each corresponding parameter. The method of obtaining the integrated calibration parameter is not limited thereto. For example, the integrated calibration parameter may be obtained based on a machine learning model.

Subsequently, according to an embodiment, the processor 130 may update a parameter value stored in the memory 120 based on the obtained integrated calibration parameter value.

Meanwhile, according to an embodiment, the processor 130 may update a parameter value based on an application provided in the electronic apparatus 100.

According to an embodiment, when an external impact equal to or greater than a threshold value is sensed through a sensor (not illustrated), the processor 130 may obtain an integrated calibration parameter value by driving a predetermined application, and update a parameter value stored in the memory 120 based on the integrated calibration parameter value. Here, the sensor (not illustrated) may include at least one of an acceleration sensor, a gyro sensor or a pressure sensor, but is not limited thereto.

According to another embodiment, when a user command for correcting a parameter value of a camera is input through a predetermined application, the processor 130 may obtain an integrated calibration parameter value, and update a parameter value stored in the memory 120 based on the obtained integrated calibration parameter value.

Meanwhile, according to an embodiment, the processor 130 may correct a captured image corresponding to a feature type based on a calibration parameter value corresponding to the feature type, obtain an error value of the corrected captured image based on a predetermined correction algorithm, and when the obtained error value is less than a threshold value, determine the calibration parameter value as a calibration parameter value corresponding to the feature type. In this case, the correction algorithm may be an algorithm in which an error value is obtained based on distortion information of the captured image.

For example, when the captured image is an indoor scene type, the processor 130 may extract distortion information regarding an external feature of an indoor object of the captured image that is corrected based on the obtained calibration parameter and obtain the same as an error value. Subsequently, when the obtained error value is less than a threshold value, the processor 130 may determine the obtained calibration parameter value as a calibration parameter value corresponding to a feature type.

Meanwhile, according to an embodiment, the processor 130 may correct a parameter value stored in the memory 120 using a calibration module corresponding to an extracted feature type, and determine a calibration parameter value corresponding to a feature type of an extracted feature point based on the corrected parameter value. The calibration module will be described in detail with reference to FIGS. 8A-8C.

Figure 3:
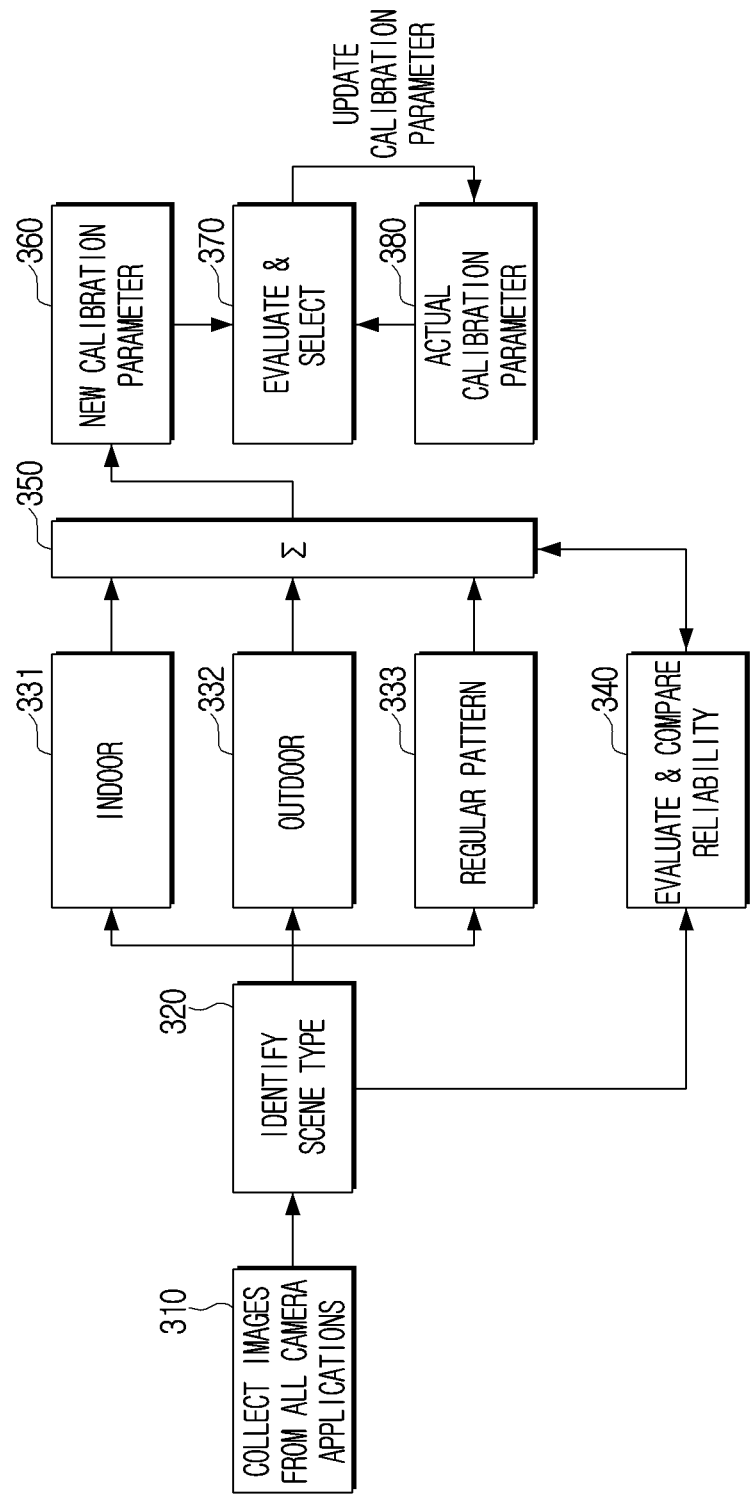
FIG. 3 is a flowchart provided to explain a controlling method of an electronic apparatus according to an embodiment.

FIG. 3 is a flowchart provided to explain a controlling method of an electronic apparatus according to an embodiment.

The processor 130 may collect an image (or a captured image) using one or more camera applications inside the electronic apparatus (310). Subsequently, the processor 130 may identify a scene type of the obtained captured image (320). In this case, the captured image may be identified as at least one of an indoor scene type, an outdoor scene type or a regular pattern scene type.

Subsequently, the processor 130 may extract a feature (or a feature point) of each captured image based on the identified scene type, and obtain a calibration parameter of each captured image based on the extracted feature (331 to 333). In this case, the processor 130 may extract a feature point of the captured image based on a feature extraction method corresponding to the identified scene type. For example, in the case of the captured image identified as a first scene type, the processor 130 may extract a feature point of the captured image based on a feature extraction method corresponding to the first scene type, and may not extract a feature point of the captured image identified as the first scene type based on a feature extraction method corresponding to a second scene type that is different from the first scene type.

Subsequently, the processor 130 may obtain an integrated calibration parameter based on a calibration parameter of each of the obtained captured images (350). Meanwhile, it is possible that the captured image may be identified as a plurality of scene types. For example, a first area of the captured image may satisfy the criteria of the indoor scene type and a second area of the captured image may satisfy the criteria of the outdoor scene type. In this case, the scene type of the captured image may be determined based on a scene type of a region of interest and/or based on a scene type having a higher reliability score. Accordingly, a reliability score corresponding to the identified scene type may be assigned to each captured image (340). The processor 130 may obtain an integrated calibration parameter by integrating a calibration parameter of the captured image where the reliability score is reflected.

When the integrated calibration parameter is obtained (360), the processor 130 may evaluate the obtained integrated calibration parameter and select one of an existing calibration parameter or the integrated calibration parameter based on the evaluation (370). When one of the existing calibration parameter or the integrated calibration parameter is selected, the processor 130 may determine an actual calibration parameter 380 based on a result of the selection. For example, when the integrated calibration parameter is selected, the processor 130 may update the actual calibration parameter 380 to the integrated calibration parameter.

In this case, the processor 130 may calculate an error value corresponding to a parameter in order to evaluate the calibration parameter in 370, which may be a relatively simple procedure compared to the feature point extraction steps in 331 to 333.

For example, when a captured image is identified as the first scene type in the scene type identification step, but has a reliability score relatively lower than other captured images, a calibration parameter may be obtained based on a feature point extraction method of a scene type other than the first scene type, and an error value may be extracted based on the obtained calibration parameter. According to another embodiment, the processor 130 may reduce a calibration parameter evaluation time by selectively performing evaluation of a calibration parameter when a captured image in which the number of feature points or frames is relatively lower than other captured images.

According to an embodiment, for illustrative purposes, it is assumed that a captured image is an indoor image including a plurality of straight lines. The processor 130 extracts the curvature of the plurality of straight lines included in an object which is a feature point or in a background, and obtains a calibration parameter that minimizes the extracted curvature. In this case, a calibration parameter that minimizes each of extracted curvatures of the plurality of straight lines may be obtained. Subsequently, the processor 130 obtains a plurality of estimated calibration parameters that minimize the curvature of each of the plurality of straight lines, and evaluate the obtained estimated calibration parameters. For example, the processor 130 may compare the error values of the plurality of estimated calibration parameters with the error values of the previously obtained calibration parameters and select a calibration parameter having a lower (or lowest) error value.

According to another embodiment, the processor 130 may evaluate a calibration parameter value by identifying whether the obtained calibration parameter value falls within a threshold value. For example, when the focal length among the obtained parameter values exceeds a predetermined value, the processor 130 may obtain a new calibration parameter value. According to another embodiment, the processor 130 may obtain a variation value of a calibration parameter value of another captured image, and when the obtained variation value exceeds a predetermined value, the processor 130 may remove the previously obtained calibration parameter and obtain a new calibration parameter value.

Figure 4:
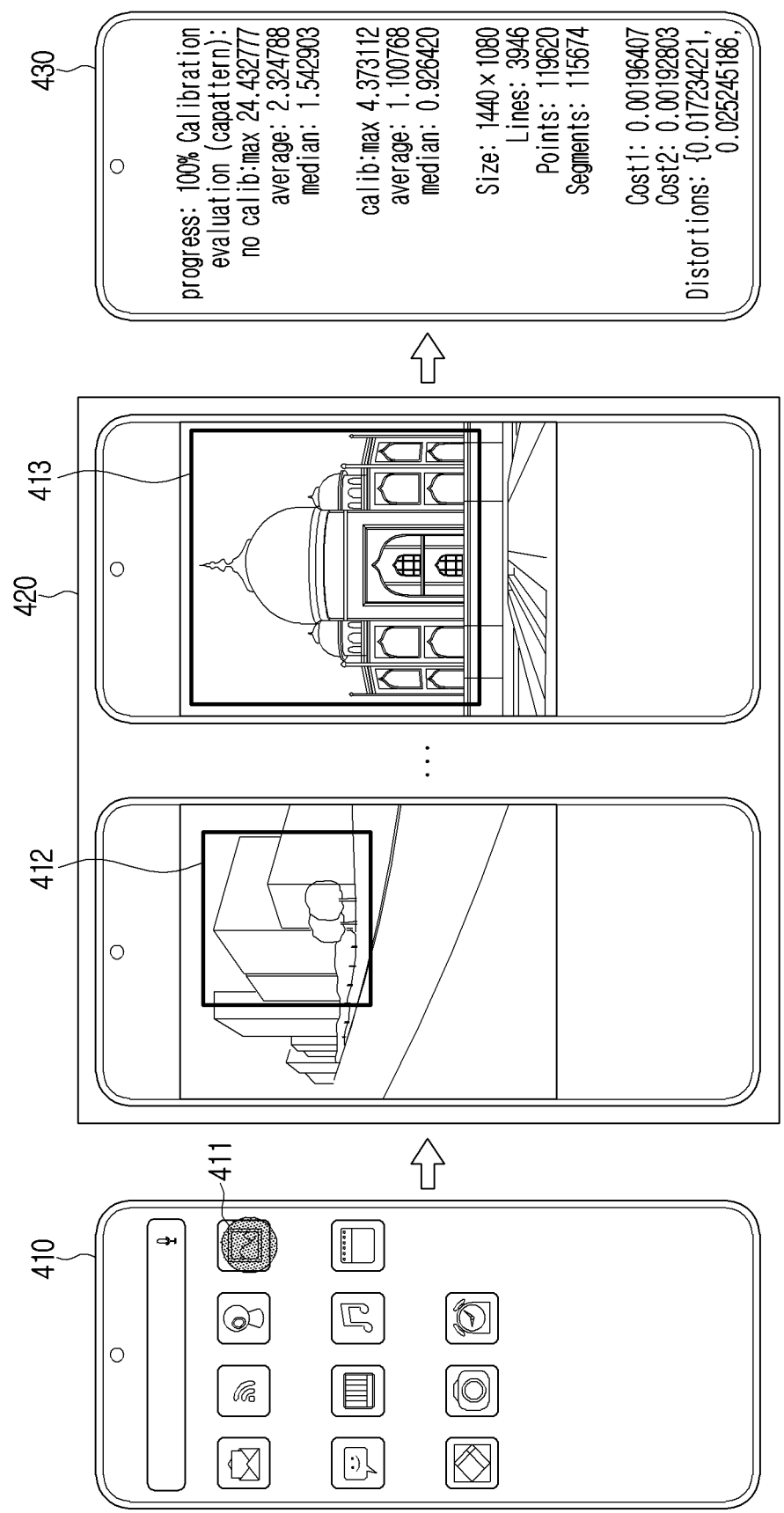
FIG. 4 is a view provided to explain a method of obtaining a calibration parameter value according to an embodiment.

FIG. 4 is a view provided to explain a method of obtaining a calibration parameter value according to an embodiment.

According to FIG. 4, firstly, the processor 130 may receive a user command for correcting a parameter value of the camera 110 through a predetermined application 411 (410). In this case, the captured image obtained through the camera 110 may be pre-stored in the memory 120.

Subsequently, the processor 130 may identify a scene type of each of a plurality of captured images, and extract a feature point of each of the plurality of captured images based on a feature point extraction method corresponding to the identified scene type (420). When the captured images are identified as outdoor images as illustrated in FIG. 4, the processor 130 may identify a building and a tree (412 and 413) as outdoor objects in the captured images, identify the morphological feature of the identified outdoor objects (412 and 413) as unique feature of the objects, and extract the same as the feature point of the outdoor images.

Subsequently, the processor 130 may obtain distortion information of the morphological feature of the extracted outdoor images, and obtain one or more calibration parameter values based on the obtained distortion information (430). Here, the feature points extracted from the outdoor images may be separately used to obtain respective calibration parameter values or may be used together to obtain one calibration parameter value (e.g., integrated calibration parameter value). The processor 130 may update a parameter of the camera based on the one or more obtained calibration parameter values and accordingly, may provide a corrected captured image to the user.

Figure 5A:
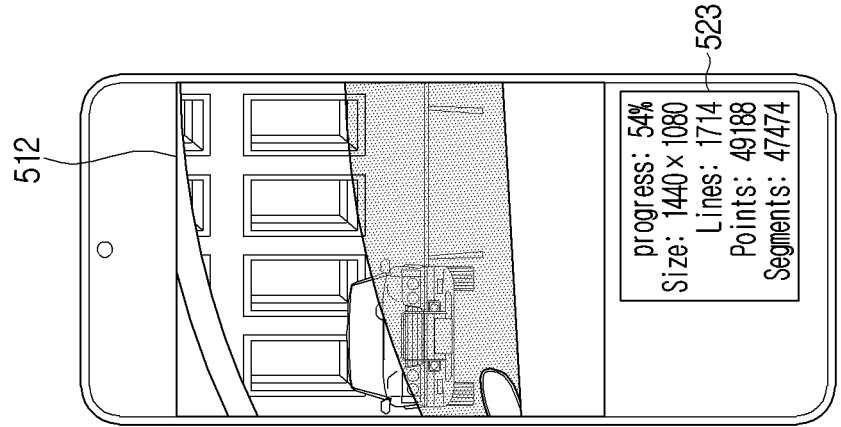
FIGS. 5A, 5B, and 5C are views provided to explain a method of identifying a scene type according to an embodiment.
Figure 5B:
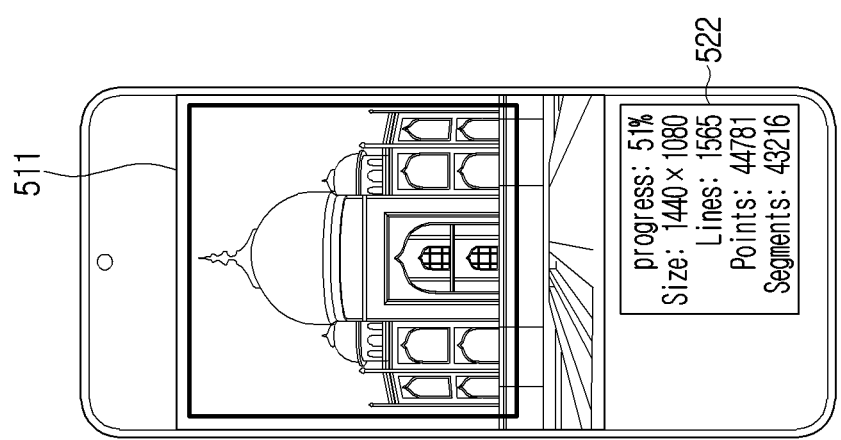
Figure 5C:
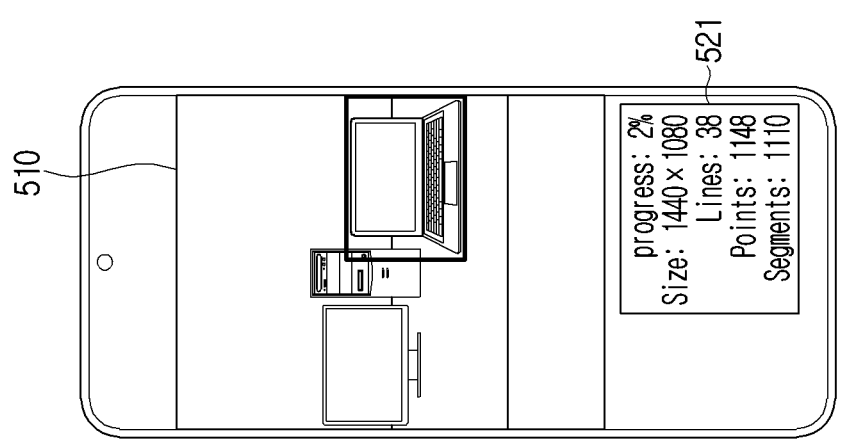

FIGS. 5A, 5B, and 5C are views provided to explain a method of identifying a scene type according to an embodiment.

According to an embodiment, the processor 130 may identify an object in a captured image and identify a scene type of the captured image based on the identified object. According to FIG. 5A, when an indoor object such as a notebook PC or a desktop PC is identified in a captured image 510, the processor 130 may identify that the corresponding captured image 510 is an indoor scene type (521). However, there may exist a case in which a notebook PC or a desktop PC is identified even in an outdoor captured image and in this case, a relatively low reliability score may be obtained compared to the case of the notebook PC or the desktop PC being identified in an indoor captured image. For example, the processor 130 may determine that there is a possibility that the captured image is an outdoor image based on brightness level of the captured image but identifies the captured image as the indoor scene type due to the detected indoor object such as a notebook PC or a desktop PC. In this case, the processor 130 may assign a relatively low reliability score to the identified scene type (e.g., the indoor scene type) of the captured image.

Referring to FIG. 5B, when an outdoor object such as a building is identified in a captured image 511, the processor 130 may identify that the corresponding captured image 511 is an outdoor scene type (522).

Referring to FIG. 5C, when an object in a captured image 512 is not clearly identified, and it is an image where a certain pattern is formed, the processor 130 may identify that the captured image is a regular pattern scene type (523). However, in an embodiment, depending on whether an outdoor object such as a car in the captured image is identified or not, the captured image may be identified as at least one of an outdoor scene type or an indoor scene type.

In an embodiment, if there is no outdoor object identified in the captured image, the processor 130 may identify the scene type of the captured image as an indoor scene type. The processor 130 may extract a feature point of the captured image according to the feature point extraction method of the identified scene type of the captured image.

According to another embodiment, when a regular pattern is identified in a captured image, for example, a wall covered with a repeating wallpaper, a building wall made of bricks, or a flat object with a texture is identified, the processor 130 may identify that the captured image is a regular pattern scene type. The processor 130 may identify the regular pattern scene type regardless of whether an indoor object or an outdoor object is identified from the captured image.

Figure 6:
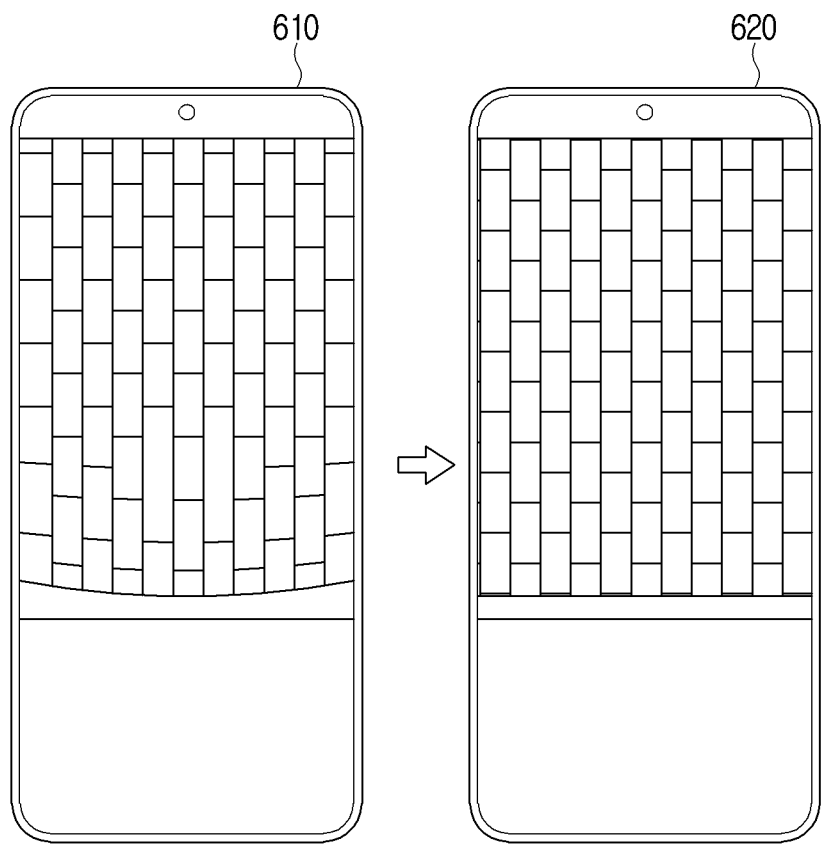
FIG. 6 is a view provided to explain a method of providing a corrected captured image according to an embodiment.

FIG. 6 is a view provided to explain a method of providing a corrected captured image according to an embodiment.

According to FIG. 6, the processor 130 may identify a captured image 610 as a regular scene type in which a certain pattern is formed. Subsequently, the processor 130 may extract an arbitrary point in the captured image as a feature point based on a feature point extraction method according to the regular scene type, and obtain a calibration parameter based on the extracted feature point. The processor 130 may update a parameter value of the camera 110 using the obtained calibration parameter value, correct the captured image based thereon and provide the corrected captured image to the user (620).

Figure 7A:
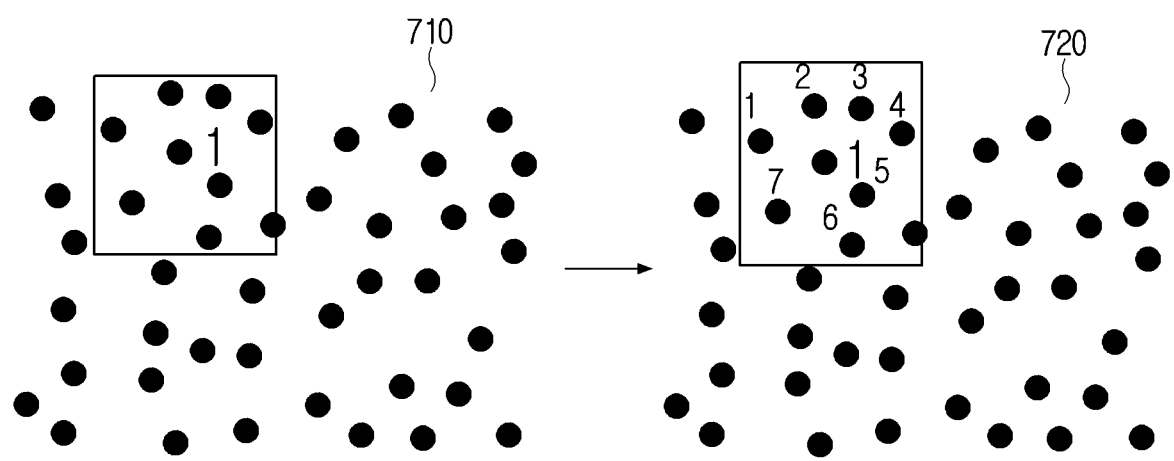
FIG. 7A is a view provided to explain a method of extracting a feature point according to an embodiment.
Figure 7B:
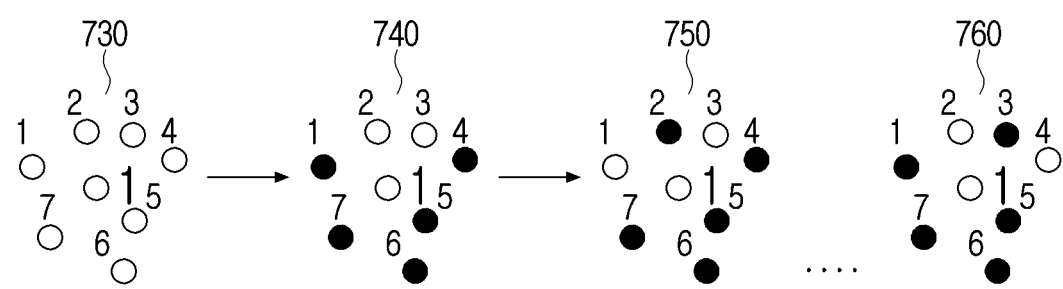
FIG. 7B is a view provided to explain a method of extracting a feature point according to an embodiment.
Figure 7C:
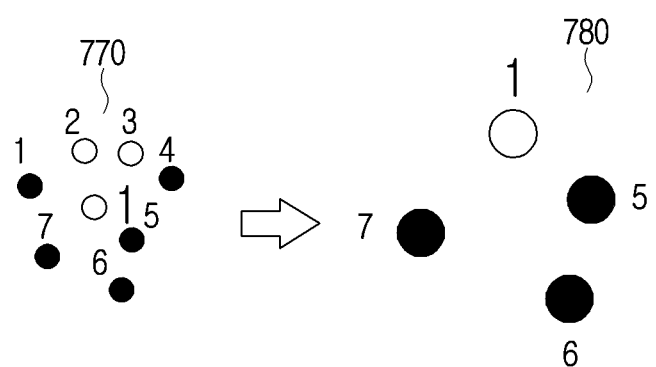
FIG. 7C is a view provided to explain a method of extracting a feature point according to an embodiment.

FIGS. 7A and 7B are views provided to explain a feature point extraction method according to an embodiment.

According to an embodiment, when a captured image is identified as a regular pattern image, the processor 130 may extract a feature point of the captured image in a Locally Likely Arrangement Hashing (LLAH) method. Hereinafter, the method of extracting a feature point of a captured image in an LLAH method will be described.

Firstly, the processor 130 generates arbitrary two-dimensional (2D) points that are uniformly distributed.

$$p_i(x, y) = \begin{vmatrix} x \in (\min_x, \max_x) \\ y \in (\min_y, \max_y) \end{vmatrix} \quad \langle \text{Mathematical Equation 3} \rangle$$

$p_i$ refers to an arbitrary point in the captured image, and x and y refer to an X-axis value and Y-axis value of the arbitrary point, respectively.

According to an embodiment, the coordinates of the arbitrary point may be randomly distributed in an area that is a predetermined area. For example, the area size may be 552 mm*475 mm. In this case, the value of $\max_x$ may be 552 mm, and the value of $\max_y$ may be 475 mm.

According to <Mathematical Equation 4>, the function f(x) for x and the function f(y) for y may be the same and may be defined as below.

$$f(x) = \\ f(y) = \begin{vmatrix} \frac{1}{\max - \min}, \min < x(\text{or } y) < \max \\ 0, \text{ otherwise} \end{vmatrix} \quad \langle \text{Mathematical Equation 4} \rangle$$

Meanwhile, the number of points may vary according to calculation efficiency. Subsequently, after arbitrary points are generated, the generated arbitrary points are distributed on the captured image.

Subsequently, when the randomly distributed points are generated, a predetermined set of a plurality of adjacent location points (number n) may be obtained for each point. For example, the processor 130 obtains seven adjacent points for each randomly generated 2D point (710 and 720).

The adjacent points may be obtained based on a Euclidian distance method as follows. The Euclidian distance may be calculated between the so-called parent (target) point (the large number 1 in 710) and all remaining points of the set. The Euclidian distance is calculated by Mathematical Equation 5.

$$d_i^j = \sqrt{(x_i - x_j)^2 + (y_i - y_j)^2} \quad \langle \text{Mathematical Equation 5} \rangle$$

A point satisfying the minimum Euclidian distance may be closest to a given point. According to FIG. 7A, seven points in 720 may be selected as points closest to the point corresponding to the large number 1 in 710.

Subsequently, the processor 130 may estimate an angle at which an adjacent point is located for each point through Mathematical Equation 6.

$$a_i^j = \arctan\left(\frac{y_j - y_i}{x_j - x_i}\right) \quad \langle \text{Mathematical Equation 6} \rangle$$

In this case, the alignment of adjacent points according to the angle is performed in ascending order. From seven adjacent points (730), five points are selected and twenty-one possible combinations of the selected five points may be generated (740 to 760).

Figure 7D:
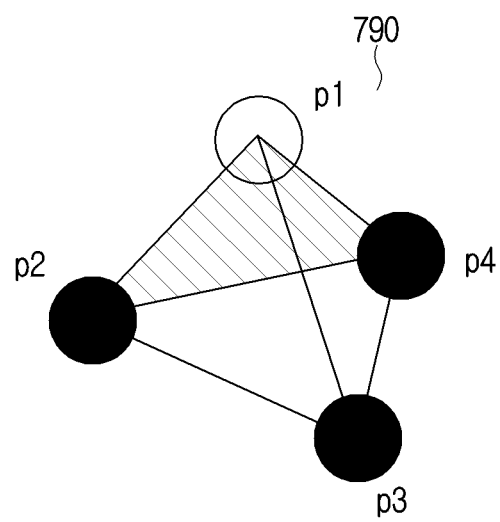
FIG. 7D is a view provided to explain a method of extracting a feature point according to an embodiment.

Subsequently, the processor 130 may select four points among the five points (780), and one of the selective four points is a parent point. In this regard, the processor 130 may perform affine invariant estimation. The affine invariant estimation is the ratio of area of the hatched part (e.g., triangle consisting of p1, p2 and p4) and the ratio of area of the triangle consisting of p2, p3 and p4 in FIG. 7D in a tetrahedron created with four points, which may be calculated through Mathematical Equation 7.

$$S_{p_1 p_2 p_4} = \frac{1}{2}|(x_{p_1} - x_{p_4}) \times (y_{p_2} - y_{p_4}) - \\ (y_{p_1} - y_{p_4}) \times (x_{p_2} - x_{p_4})| \quad \langle \text{Mathematical Equation 7} \rangle$$

$$S_{p_2 p_3 p_4} = \frac{1}{2}|(x_{p_2} - x_{p_4}) \times (y_{p_3} - y_{p_4}) - (y_{p_2} - y_{p_4}) \times (x_{p_3} - x_{p_4})|$$

$$r_l = \frac{S_{p_1 p_2 p_4}}{S_{p_2 p_3 p_4}}, l \in [0, nCm]$$

Meanwhile, the processor 130 may perform affine invariant estimation with respect to all combinations of the adjacent points. Among them, only one combination having the maximum value may be identified. For each combination of floating-point values, the quantization level n(v) may be computed for the corresponding rate increase, and it may be computed through Mathematical Equation 8. Here, q(v) is a quantization level function.

$$n(v) = \begin{cases} n(v) \times 2^q + q(v), (n(v) \times 2^q + q(v) < hashsize) \\ (n(v) \times 2^q + q(v))\% \ hashsize, \\ (n(v) \times 2^q + q(v) \geq hashsize) \end{cases} \quad \langle \text{Mathematical Equation 8} \rangle$$

Subsequently, the processor 130 may record the result value in a 1D array and align an array of a descriptor for each point. Afterwards, the processor 130 may repeat the above-described procedures for each randomly generated point from the beginning, and assign the corresponding descriptor for each arbitrary point.

When an arbitrary point is extracted from the captured image, the processor 130 may perform matching between 2D points. In this case, the processor 130 may select an adjacent point to assign the same descriptor to arbitrary points.

The processor 130 may assign a descriptor for an arbitrary point extracted from the captured image in the above-described method, and identify a point group including randomly distributed points based on each descriptor. The processor 130 may identify a point to which a descriptor is assigned in the point group including the randomly distributed points, and identify whether the point has a value equal to or greater than a threshold value using homography. Through this, the processor 130 may identify a group of other points having the same geometric relationship (or ratio) as a group of at least one randomly distributed point.

In this case, the processor 130 may first select only a point related to the descriptor of the LLAH function. Subsequently, a feature point on a flat surface may be selected. The processor 130 may obtain a 3D point matching a preliminarily generated arbitrary 2D point according to a geometric relationship for such a detected point through Mathematical Equation 9.

$$p_i^{3d}(x_i^{2d}, y_i^{2d}, 0) \qquad \text{<Mathematical Equation 9>}$$

Meanwhile, as the number of randomly distributed points increases, more matching points in the captured image may be obtained.

When 2D and 3D points are defined, the processor 130 may obtain a parameter based on the above-described procedure and an algorithm pre-stored in the memory 120.

Meanwhile, according to an embodiment, the scene type identification may be performed by calculating a reliability score for a feature point extraction method based on a descriptor corresponding to an area of interest of the captured image and based on this, selecting a feature point extraction method. In this case, different feature point extraction methods may be applied to the same image simultaneously.

Figure 8A:
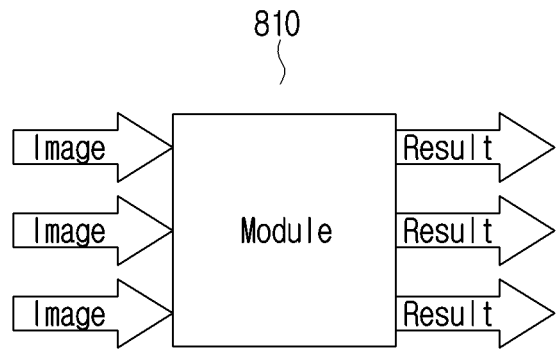
FIGS. 8A, 8B, and 8C are views provided to explain a method of obtaining a calibration result value according to an embodiment.
Figure 8B:
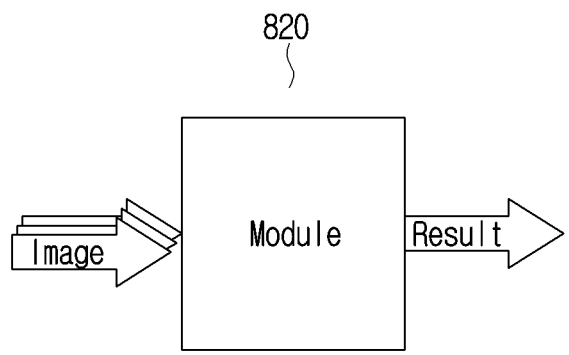
Figure 8C:
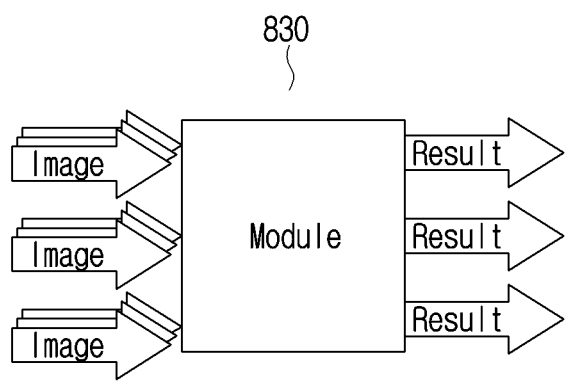

FIGS. 8A, 8B, and 8C are views provided to explain a method of obtaining a calibration result value according to an embodiment.

According to FIGS. 8A-8C, the processor 130 may identify a scene type of a captured image, extract a feature point of the captured image based on a feature point extraction method corresponding to the identified scene type, and based on this, obtain a calibration result value. In this case, the processor 130 may obtain the calibration result value (or parameter value) through a calibration module.

According to an embodiment, referring to FIG. 8A, when data for a plurality of captured images is input to a calibration module, the processor 130 may obtain a result value for each of the plurality of captured images through the calibration module (810). According to another embodiment, referring to FIG. 8B, when data for a plurality of captured images is input to a calibration module, the processor 130 may obtain one result value based on the plurality of captured images (820). According to yet another embodiment, referring to FIG. 8C, when data for a plurality of captured images is input to a calibration model, the processor 130 may divide the data for the plurality of captured images into batches including the plurality of captured images and obtain a calibration result value according to each batch data (830).

Figure 9A:
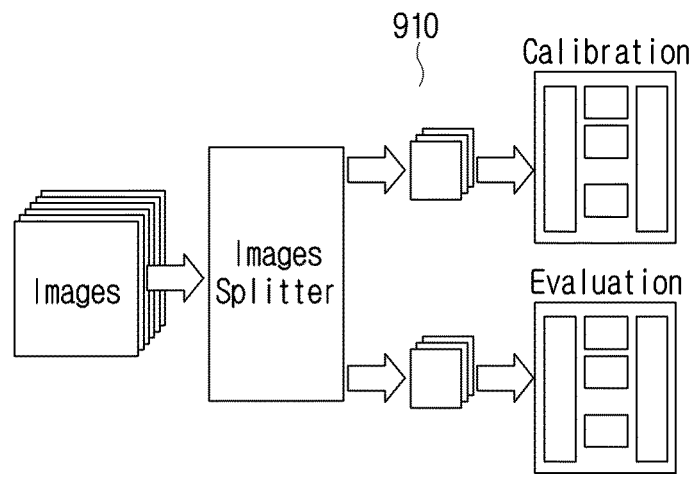
FIGS. 9A, 9B, and 9C are views provided to explain a method of evaluating and selecting a parameter according to an embodiment.
Figure 9B:
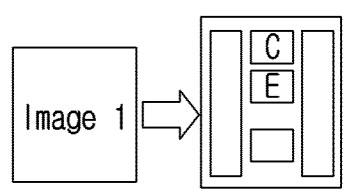
Figure 9B:
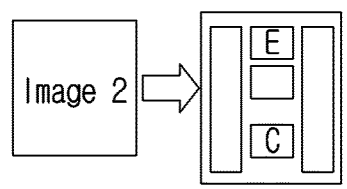
Figure 9C:
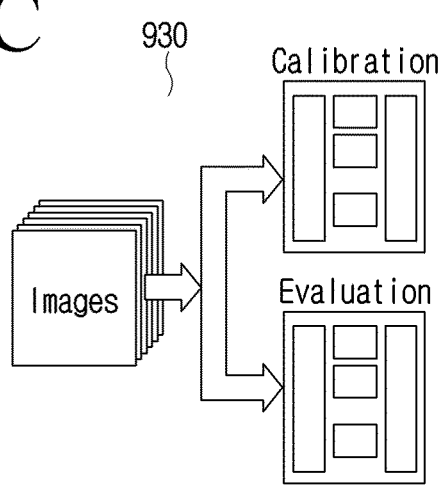

FIGS. 9A, 9B, and 9C are views provided to explain a method of evaluating and selecting a parameter according to an embodiment.

According to an embodiment, referring to FIG. 9A, the processor 130 may divide a plurality of captured images through an image splitter. In this case, each of the plurality of divided captured images may be calibrated or evaluated (910). According to another embodiment, referring to FIG. 9B, the processor 130 may perform calibration and evaluation simultaneously through one algorithm, or the processor 130 may perform calibration and evaluation through separate algorithms (920). In the latter case, the processor 130 may perform calibration and evaluation for each of the plurality of captured images stored in the memory 120 based on different algorithms. According to yet another embodiment, referring to FIG. 9C, the processor 130 may perform calibration and evaluation for a plurality of captured images in a lump without dividing the plurality of captured images.

Figure 10A:
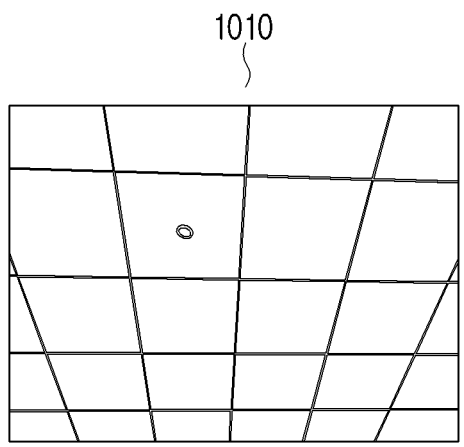
FIGS. 10A and 10B are views provided to explain a method of extracting a feature point according to an embodiment.
Figure 10B:
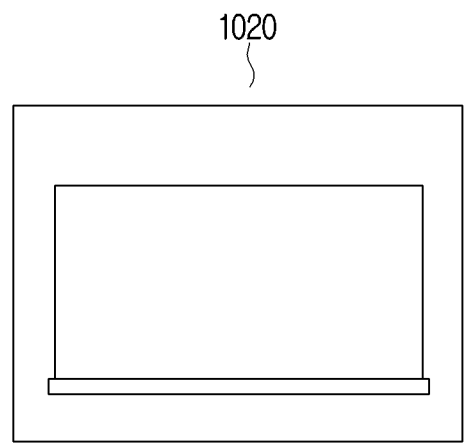

FIGS. 10A and 10B are views provided to explain a method of extracting a feature point according to an embodiment.

According to FIG. 10, in order to extract a feature point in a captured image, an image including at least one of an object or a regular pattern may be captured. Alternatively, at least one identifiable feature needs to be included in the captured image. In the case of an image 1020 that corresponds to an indoor scene where a whiteboard is hung on a wall, the processor 130 may fail to extract a feature point from the image 1020. Meanwhile, in the case of an image 1010 corresponding to an indoor ceiling, the processor 130 may extract relatively more feature points compared to the above-described image 1020. Accordingly, a feature point may be extracted by identifying a textured scene (e.g., a regular pattern scene) and extracting a flat part from the textured scene.

Figure 11:
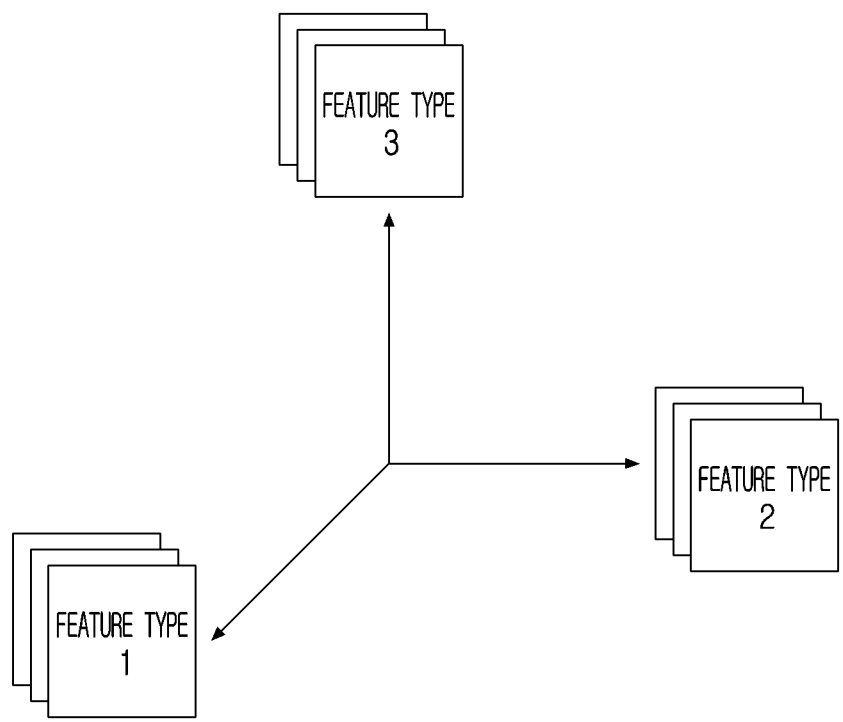
FIG. 11 is a view provided to explain a method of extracting a feature point according to an embodiment.

FIG. 11 is a view provided to explain a method of extracting a feature point according to an embodiment.

According to FIG. 11, a data set for captured images may be classified into a plurality of feature types according to characteristics of each captured image. In this case, one captured image may have only one feature type. Meanwhile, when a feature point is extracted without going through the classification process according to the above-described embodiment, one captured image may have a plurality of feature types.

Figure 12:
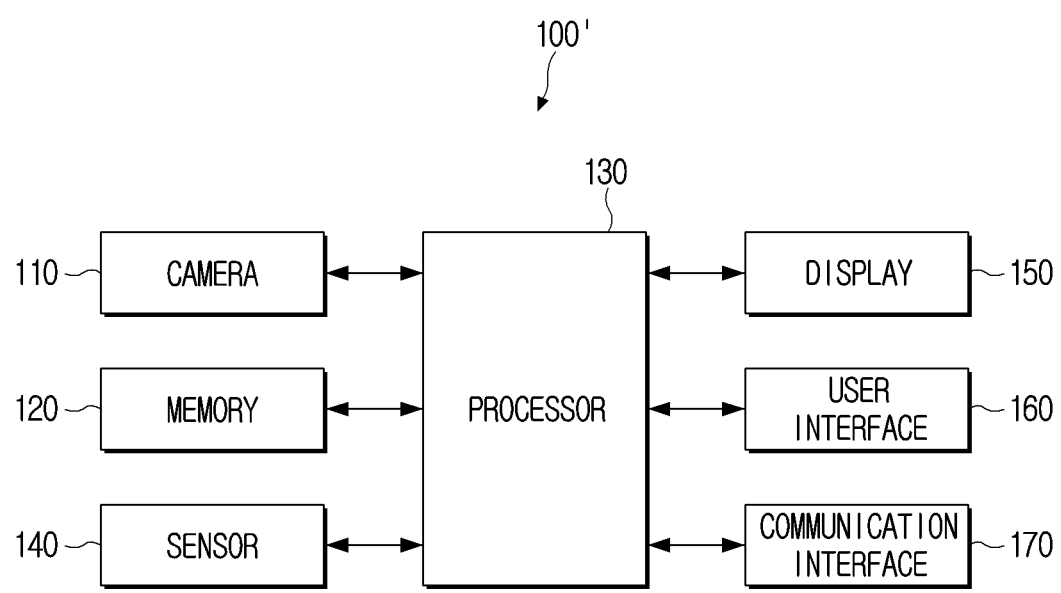
FIG. 12 is a view provided to explain a detailed configuration of an electronic apparatus according to an embodiment.

FIG. 12 is a view provided to explain detailed a configuration of an electronic apparatus according to an embodiment.

According to FIG. 12, an electronic apparatus 100' may include the camera 110, the memory 120, the processor 130, a sensor 140, a display 150, a user interface 160, and a communication interface 170. Among the components illustrated in FIG. 12, the detailed description of the components overlapping with the components illustrated in FIG. 2 will be omitted.

The sensor 140 may sense an operation or an operating state (e.g., power or temperature) of the electronic apparatus 100 or an external environmental state (e.g., user state), and generate an electrical signal or a data value corresponding to the sensed state. According to an embodiment, the sensor 140 may include, for example but not limited to, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The display 150 may be, for example, implemented as a display including an emissive element or a display including a non-emissive element and a backlight. For example, the display 150 may be implemented as various forms of displays such as Liquid Crystal Display (LCD), Organic Light Emitting Diodes (OLED), Light Emitting Diodes (LED), micro LED, Mini LED, Plasma Display Panel (PDP), Quantum dot (QD) display, Quantum dot light-emitting diodes (QLED), etc. The display 150 may also include a driving circuit, a backlight circuit, etc. that may be implemented in the form of a-si TFT, low temperature poly silicon (LTPS) TFT, organic TFT (OTFT), etc.

Meanwhile, the display 150 may be implemented as a touch screen combined with a touch sensor, a flexible display, a rollable display, a 3D display, a display in which a plurality of display modules are physically connected, etc. In addition, the display 150 may be implemented to include a touch screen so that a program may be executed using a finger or a pen (e.g., a stylus pen).

The user interface 160 is configured for the electronic apparatus 100' to perform an interaction with a user. For example, the user interface 160 may include at least one of a touch sensor, a motion sensor, a button, a jog dial, a switch, a microphone or a speaker, but is not limited thereto.

At least one communication interface 170 may be implemented as various interfaces according to an embodiment of the electronic apparatus 100. For example, the communication interface 170 may perform communication with an external device, an external storage medium (e.g., a USB memory), an external server, etc. through a communication method such as various types of digital interfaces, AP-based Wi-Fi (Wireless LAN Network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, etc.

Figure 13:
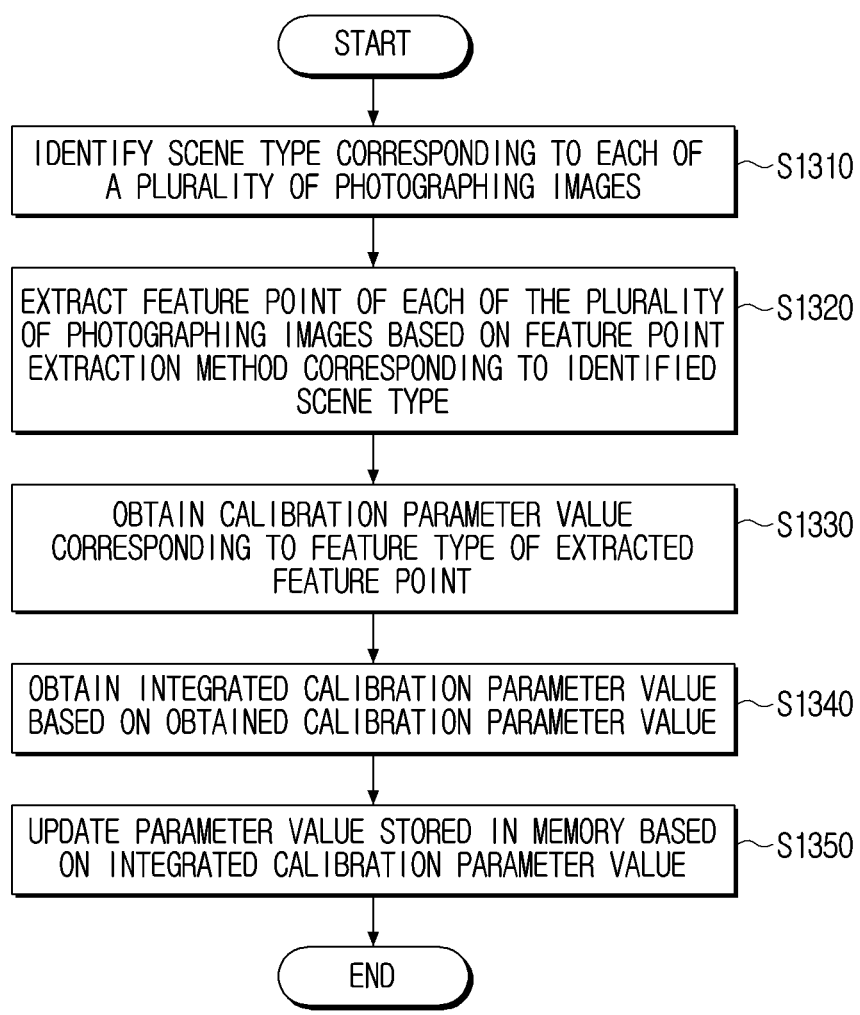
FIG. 13 is a flowchart provided to explain a controlling method of an electronic apparatus according to an embodiment.

FIG. 13 is a flowchart provided to explain a controlling method of an electronic apparatus according to an embodiment.

According to FIG. 13, a scene type corresponding to each of a plurality of captured images is identified (S1310).

Subsequently, once the scene type is identified, a feature point of each of a plurality of captured images is extracted based on a feature point extraction method corresponding to the identified scene type (S1320).

Subsequently, the processor 130 obtains a calibration parameter value corresponding to a feature type of the extracted feature type (S1330).

Then, an integrated calibration parameter value is obtained based on the obtained calibration parameter value (S1340). In an embodiment, the integrated calibration parameter value may be obtained based on one calibration parameter value (e.g., FIG. 8A) or a plurality of calibration parameter values (e.g., FIG. 8B or 8C).

Subsequently, a parameter value stored in the memory is updated based on the integrated calibration parameter value (S1350).

In addition, a calibration parameter value corresponding to the feature type of the extracted feature point may be further obtained by correcting the parameter value stored in the memory using a calibration module corresponding to the feature type of the extracted feature point.

Here, the step of S1310 may further include identifying a scene type corresponding to each of the plurality of captured images by assigning a reliability score for a scene type corresponding to each of the plurality of captured images and identifying a weight for a parameter value corresponding to each of the plurality of images based on the reliability score corresponding to each of the plurality of captured images.

In addition, the step of S1330 may include obtaining a calibration parameter value corresponding to a feature type of the extracted feature point based on the identified weight.

In addition, the step of S1330 may further include correcting a captured image corresponding to a feature type based on a calibration parameter value corresponding to the feature type and obtaining an error value of the corrected captured image based on a predetermined correction algorithm.

In addition, the step of S1330 may include, based on the obtained error information being less than a threshold value, obtaining a calibration parameter value as a calibration parameter value corresponding to the feature type.

Further, the step of S1320 may include, based on the scene type of a captured image being a first scene type or a second scene type, extracting a feature point based on an object identified in the captured image, and based on the scene type of the captured image being a third scene type, randomly extracting a feature point in the captured image.

In addition, the step of S1340 may include, based on an external impact equal to or greater than a threshold value being sensed through a sensor, obtaining an integrated calibration parameter value by driving a predetermined application.

Further, the step of S1350 may include updating a parameter value stored in a memory based on the integrated calibration parameter value.

In addition, the step of S1340 may include, based on a user command for correcting a parameter value of a camera being input through a predetermined application, obtaining an integrated calibration parameter value.

Further, the step of S1350 may include updating a parameter value stored in a memory based on the integrated calibration parameter value.

According to various embodiments, a feature point may be extracted from a captured image, and based on this, a corrected captured image may be obtained by correcting a camera parameter. Accordingly, user satisfaction may be improved.

Meanwhile, the methods according to the example embodiments of the disclosure described above may be implemented in the form of an application that may be installed in a display apparatus. Alternatively, the methods according to the example embodiments of the disclosure described above may be performed using a deep learning-based artificial neural network (or a deep artificial neural network), that is, a learning network model. In addition, the methods according to example embodiments of the disclosure described above may be implemented only by software upgrade and/or hardware upgrade for the existing display apparatus. Further, the example embodiments of the disclosure described above may also be performed through an embedded server included in the electronic apparatus or an external server of the electronic apparatus.

Meanwhile, the above-described various embodiments of the disclosure may be implemented as software including instructions that may be stored in machine-readable storage media, which may be read by machine (e.g., computers). The machine refers to an apparatus that calls instructions stored in a storage medium, and may operate according to the called instructions, and the apparatus may include an electronic apparatus (e.g., an electronic apparatus (A)) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, the method according to the various embodiments described above may be provided while being included in a computer program product. A computer program product refers to a product, and it may be traded between a seller and a buyer. The computer program product may be distributed on-line in the form of a storage medium that is readable by machines (e.g., a compact disc read only memory (CD-ROM)), or through an application store (e.g., Playstore™). In the case of on-line distribution, at least a portion of the computer program product may be stored in a storage medium such as the server of the manufacturer, the server of the application store, and the memory of the relay server at least temporarily, or may be generated temporarily.

In addition, each of components (for example, modules or programs) according to the example embodiments described above may include a single entity or a plurality of entities, and some of the corresponding sub-components described above may be omitted or other sub-components may be further included in the example embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the example embodiments may be executed in a sequential manner, a parallel manner, an iterative manner, or a heuristic manner, at least some of the operations may be performed in a different order or be omitted, or other operations may be added.

While preferred embodiments of the disclosure have been shown and described, the disclosure is not limited to the aforementioned specific embodiments, and it is apparent that various modifications may be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
a camera;
a memory in which a plurality of images captured through the camera and a parameter value of the camera are stored; and
a processor electrically connected to the camera and the memory and configured to:
identify, among a plurality of preset scene types, a scene type corresponding to each captured image of the plurality of captured images;
extract a feature point of each captured image of the plurality of captured images by applying one of different feature point extraction methods, which are respectively preset in association with the plurality of preset scene types, according to the identified scene type of each captured image, wherein feature points extracted by the different feature point extraction methods have different feature types;
obtain a calibration parameter value based on distortion information corresponding to a feature type, among the different feature types, of each extracted feature point;
obtain an integrated calibration parameter value based on the obtained calibration parameter value corresponding to the feature type; and
update the parameter value stored in the memory based on the integrated calibration parameter value.

2. The electronic apparatus as claimed in claim 1, wherein the processor is further configured to obtain a calibration parameter value corresponding to a captured image by correcting the parameter value stored in the memory based on distortion information corresponding to a feature type of an extracted feature point of the captured image.

3. The electronic apparatus as claimed in claim 2, wherein the processor is further configured to:
identify a scene type corresponding to the captured image by assigning a reliability score for the scene type corresponding to the captured image;
identify a weight for a parameter value corresponding to the captured image based on the reliability score for the scene type corresponding to the captured image; and
obtain the integrated calibration parameter value further based on the identified weight.

4. The electronic apparatus as claimed in claim 1, wherein the processor is further configured to:
correct a captured image based on a first calibration parameter value based on distortion information corresponding to a feature type of the captured image;
obtain an error value of the corrected captured image based on a predetermined correction algorithm; and
based on the obtained error value being less than a threshold value, obtain the integrated calibration parameter value based on the first calibration parameter value.

5. The electronic apparatus as claimed in claim 1, wherein the processor is further configured to:
based on a scene type of a captured image being a first preset scene type or a second preset scene type, extract a feature point based on an object identified in the captured image; and
based on a scene type of the captured image being a third preset scene type, randomly extract a feature point in the captured image.

6. The electronic apparatus as claimed in claim 5, wherein the first preset scene type is an outdoor scene type,
wherein the second preset scene type is an indoor scene type, and
wherein the third preset scene type is a regular pattern scene type.

7. The electronic apparatus as claimed in claim 1, wherein the parameter value of the camera is a value corresponding to at least one parameter among a focal length, a principal point, a skew coefficient, a distortion coefficient, a rotation information, or a translation information.

8. The electronic apparatus as claimed in claim 1, further comprising:
a sensor,
wherein the processor is further configured to:

based on an external impact equal to or greater than a threshold value being sensed through the sensor, obtain the integrated calibration parameter value by driving a predetermined application and update the parameter value stored in the memory based on the integrated calibration parameter value.

9. The electronic apparatus as claimed in claim 1, wherein the processor is further configured to:

based on a user command for correcting the parameter value of the camera being input, obtain the integrated calibration parameter value, and update the parameter value stored in the memory based on the integrated calibration parameter value.

10. The electronic apparatus as claimed in claim 1, wherein the plurality of preset scene types include an outdoor scene type, an indoor scene type, and a regular pattern scene type, and wherein the feature type corresponds to the identified scene type.

11. A controlling method of an electronic apparatus, comprising:

identifying, among a plurality of preset scene types, a scene type corresponding to each captured image of a plurality of captured images;

extracting a feature point of each captured image of the plurality of captured images by applying one of different feature point extraction methods, which are respectively preset in association with the plurality of preset scene types, according to the identified scene type of each captured image, wherein feature points extracted by the different feature point extraction methods have different feature types;

obtaining a calibration parameter value based on distortion information corresponding to a feature type, among the different feature types, of each extracted feature point;

obtaining an integrated calibration parameter value based on the obtained calibration parameter value corresponding to the feature type; and updating a parameter value stored in a memory included in the electronic apparatus based on the integrated calibration parameter value.

12. The method as claimed in claim 11, further comprising:

obtaining a calibration parameter value corresponding to a captured image by correcting the parameter value stored in the memory based on distortion information corresponding to a feature type of an extracted feature point of the captured image.

13. The method as claimed in claim 12, wherein the identifying the scene type comprises:

identifying a scene type corresponding to the captured image by assigning a reliability score for the scene type corresponding to the captured image; and identify a weight for a parameter value corresponding to the captured image based on the reliability score for the scene type corresponding to the captured image, and wherein the obtaining the integrated calibration parameter value comprises obtaining the integrated calibration parameter value further based on the identified weight.

14. The method as claimed in claim 11, further comprising:

correcting a captured image based on a first calibration parameter value based on distortion information corresponding to a feature type of the captured image; and obtaining an error value of the corrected captured image based on a predetermined correction algorithm, wherein the obtaining the integrated calibration parameter value comprises obtaining the integrated calibration parameter value based on the first calibration parameter value.

15. The method as claimed in claim 11, wherein the extracting a feature point comprises:

based on a scene type of the captured image being a first preset scene type or a second preset scene type, extracting a feature point based on an object identified in the captured image; and based on a scene type of the captured image being a third preset scene type, randomly extracting a feature point in the captured image.

* * * * *